US005609784A

United States Patent [19]
Davenport

[11] Patent Number: 5,609,784
[45] Date of Patent: Mar. 11, 1997

[54] METHOD AND APPARATUS FOR COVERING AND HEATING FLUID FLOW DEVICES

[75] Inventor: Ronald D. Davenport, Hermitage, Tenn.

[73] Assignee: Hydrocowl, Inc., Nashville, Tenn.

[21] Appl. No.: 302,534

[22] Filed: Sep. 8, 1994

[51] Int. Cl.[6] ............... F27D 11/02; F03B 7/12; F16L 55/00
[52] U.S. Cl. .......... 219/385; 219/523; 219/213; 392/416; 137/341
[58] Field of Search .................. 219/385, 386, 219/387, 523, 542, 213; 392/416, 432, 435, 497, 501; 137/341, 375; 138/33

[56] References Cited

U.S. PATENT DOCUMENTS

| Re. 33,523 | 1/1991 | Devine | 137/341 |
|---|---|---|---|
| 3,527,921 | 9/1970 | Voglesonger | 219/213 |
| 3,962,561 | 6/1976 | Maitenaz | 219/391 |
| 4,117,305 | 9/1978 | Colten | 219/213 |
| 4,593,178 | 6/1986 | Banta et al. | 219/315 |
| 4,726,394 | 2/1988 | Devine | 137/341 |
| 5,038,018 | 8/1991 | Grise et al. | 219/213 |

*Primary Examiner*—Teresa J. Walberg
*Assistant Examiner*—J. Pelham
*Attorney, Agent, or Firm*—Wascher & Thomas, PLLC; Rick R. Wascher; Laura K. Thomas

[57] ABSTRACT

An apparatus and method for enclosing and heating a fluid flow control device. The apparatus includes a cover assembly and a heater element. The heater preferably has an elongated body for placement on or adjacent to the ground on which the fluid flow device extends. The method is directed to the use of the apparatus and positioning the heater in order to establish a substantially uniform thermal gradient within the cover in the range of less than two degrees per vertical inch of elevation.

23 Claims, 7 Drawing Sheets

METHOD AND APPARATUS FOR COVERING AND HEATING FLUID FLOW DEVICES

BACKGROUND OF THE INVENTION

1. Field of the Invention

The present invention relates generally to protective enclosures for fluid flow devices and fluid flow control devices (hereinafter collectively "fluid flow devices"), but more particularly to protective enclosures incorporating heating elements and insulated panels for fluid flow devices.

A fluid flow device such as a valve, pump, backflow prevention device, etc. typically incorporates some sort of metering or control mechanism to regulate the fluid flow within, into or out of a pipe stream. In the case of a backflow prevention device, one or more check valves are incorporated into a fluid flow line to prevent the backflow of any liquid and contaminated matter into the original uncontaminated fluid line. Since many of the aforementioned fluid control devices are installed outdoors, either above ground or above the freeze line of the ground, in certain geographical areas it is important that the devices be enclosed and protected from the weather, particularly from freezing.

2. Description of the Related Art

There are several devices for enclosing fluid flow devices. Such enclosure devices include U.S. Pat. No. 4,726,394 granted to Devine for a heated cover for pipeline backflow preventer component assembly. The Devine invention includes several side sections having top wall segments adapted to be joined along longitudinal and transverse lines and clamped together on opposite sides of a backflow prevention device.

Another such device is disclosed in Reissue U.S. Pat. No. 33,523 granted to Devine for a heated cover for pipeline backflow preventer component assembly. Like the earlier Devine patent, the Devine Re U.S. Pat. No. 33,523 incorporates a heater element disposed within the walls of the cover. The existence of a heater attached to walls of the cover sets up a thermal gradient within the cover assembly. The gradient is known to present a temperature deviation inside the cover. This temperature deviation is believed by some to be unacceptable in many applications.

Accordingly, while heating elements placed in the sidewall may provide some means of heating the internal components of the cover, such as the fluid flow devices described above, wall heating arrangements are known to be limited in their effectiveness because the thermal gradient associated with such configurations is believed to be too broad from the bottom of the cover to the top, and therefore suffer a substantial limitation in that the heat dispersed within the cover is largely non-uniform. As a result, the cover and wall heater assembly does not provide uniform protection against frost, freezing, and damage to the fluid flow device contained within the cover.

Yet another device for enclosing fluid flow devices is found in U.S. Pat. No. 4,890,638 granted to Davenport for a cover for backflow prevention device. One of the sidewalls of the Davenport device is provided with a drain opening adjacent to the platform member and an enclosure member hinged above the drain opening and biased to a closed position. In larger embodiments, the sidewalls are subdivided into removable side panels to facilitate access to the interior space within the cover member and also to facilitate ease of assembly and disassembly.

Accordingly, it would be advisable, and advantageous, to invent a cover assembly in the nature of those described above, but incorporating a heating mechanism so as to provide more uniform thermal dispersion within the cover (i.e., a smaller thermal gradient range) such that the temperature at the ground surface within the cover to the uppermost portion of the cover does not differ to the degree the art to which the invention relates differs. In this fashion, the fluid flow components at or near the bottom of the cover remain heated to a greater degree, because the thermal gradient from the floor to the roof of the internal cavity experience a much smaller thermal gradient range.

The present invention, and the heater element of the present invention used in conjunction with the aforedescribed Davenport device is believed to have solved certain problems associated with the Devine and other devices. Accordingly, until now a device and assembly for providing a smaller thermal gradient from the bottom region of the cover assembly to the top region of the cover has not been invented.

SUMMARY OF THE INVENTION

The present invention is directed to a cover assembly and heater mechanism for a fluid flow device. The cover can be of any suitable configuration, but certain configurations such as the Davenport design referenced above which many believe to be superior to other designs found in the art to which the invention relates. The heater component of the invention preferably comprises an elongated platen style heater which is placed on, near, in or adjacent to the ground surface, or on a pad placed on the ground thereby forming a suitable ground surface (hereinafter collectively and individually referred to as the "ground" or "ground surface"), from which the fluid flow device extends.

It has been determined that a heater of the configuration described below provides a much lower deviation in thermal gradient from the bottom of the interior cover space to its uppermost portions. For example, a 437.5 watt embodiment of the inventive heater disclosed herein was placed within a cover assembly having a 36 inch width, a 100 inch length and a 56 inch height. The temperature deviation was measured to be approximately 44 degrees at the floor and 51 degrees at the roof. In turn and using the same cover assembly, a 1000 watt wall heater was mounted within the cover. The temperature deviation within the cover corresponding to the wall mounted heater ranged from 30 degrees at the floor to 142 degrees at the roof. Accordingly, the present invention is also believed to be more energy efficient than cover systems using wall mounted heaters.

The heater and system of the present invention translates to a thermal gradient of approximately 0.125 degrees per vertical inch as compared to approximately 2 degrees per vertical inch for wall mounted heater systems. Accordingly, the present invention has a thermal gradient much less than 2 degrees per vertical inch.

The heating element is highly resilient and impervious to environmental elements such as water and other conditions which could affect the operation of other heater devices. The heating element is preferably composed of a cast aluminum or other metallic substance to provide greater heat transfer from the heating coils contained, disposed or situated within the confines of the body of the heating element, to the ground surface which in turn disperse the heat more uniformly throughout the cover assembly.

The heater of the present invention, therefore, has an operating range suitable for use with a variety of cover assemblies of various configurations, and thus the present invention is not limited to a specific cover assembly design or configuration.

When the heating element is used in combination with a cover for a fluid flow device, the internal ground space within the cover defines the area on which the heater may be placed. The largest heater design capable of fitting within the free space at, near or adjacent to the ground is preferred, but depending upon the application, other heater design sizes may be used.

The interior floor space of the cover is generally typically rectangular. A generally rectangular slab-like heating element is preferred in that its heating characteristics more nearly correspond to the size and shape of the exposed ground surface.

It has been shown that providing a ground or slab heating element, configured in accordance with the invention disclosed herein, to cover assemblies found in the art to which the invention relates establishes a more uniform heat dispersion within the cover and thus is believed to be more efficient at protecting the fluid flow device contained therein as compared to any other heater and cover assembly found in the art to which the invention relates and known.

The method of the present invention includes heating the fluid flow device by placing a heater element in close proximity to the ground or slab on which the fluid flow devices are positioned. The method is also directed to heating the interior surface of a cover assembly with a heater in order to establish a much lower thermal gradient than that which is currently found in the art to which the invention relates. The thermal gradient range of a 437.5 watt embodiment of the present invention was placed in a cover assembly having a 36 inch width, a 100 inch length and a 56 inch height. The temperature deviation was measured to be approximately 44 degrees at the floor and 51 degrees at the roof.

The present invention can be summarized in a variety of ways, one of which is the following: a heated cover assembly for a fluid flow device extending from a ground surface, comprising a cover having a continuous side wall, a roof, and an interior for enclosing a fluid flow device; a heater positioned within the interior of the cover adjacent to the ground; the heating element having an elongated body with a top side, a bottom side, and heating coil means disposed within the body of the heater for producing heat in response to a supplied electrical current, wherein the heat is transmitted to the body of the heating element and emanates therefrom to enable a substantially uniform thermal gradient in the interior of the cover from the base to the roof.

The continuous side wall of the cover may be comprised of a plurality of interconnected panels. The cover and heater may be connected to an optional pad establishing a ground surface. The heater is preferably constructed of metal, but more specifically, preferably cast aluminum.

The heater has a substantially rectangular shape and an edge surface interpositioned between the top and bottom surfaces. The heater shall also have a well and a cap to close off the well. At least one conductive post, but preferably two, is positioned within the well and is connected to a heating coil means embedded within the body of the heater. A thermostat is provided to regulate the heat emitted from the heater body. A means may also be provided to elevate the heater body above the ground.

The method of the present invention may be summarized in a variety of ways one of which is the following: a method of heating a fluid flow device extending from the ground and contained within a cover assembly wherein the cover assembly is comprised of a plurality of wall panels and a roof to form an interior, and further including a heater, the method comprising the steps of: providing a heater capable of responding to electrical energy to produce heat; positioning the heater adjacent to the ground from which the fluid flow device extends; supplying electrical energy to the heating element to produce heat within the interior of the cover assembly; and regulating the electrical energy to regulate the amount of heat supplied.

The method may also include providing a pad underneath the cover assembly and positioning the heater adjacent to the pad; positioning the heater directly on the ground; or positioning the heater directly on the pad.

It is an object of the present invention to provide a cover for a fluid flow device wherein the cover incorporates a heating element designed to be placed at, near or adjacent to the floor of the interior of the cover to provide more uniform thermal distribution within the cover.

It is an object of the present invention to provide a heating element in association with any fluid flow device so as to establish a substantially more uniform thermal distribution through the entire elevation of the interior space within the cover.

It is an object of the present invention to provide a heating element for use with a cover for a fluid flow device capable of withstanding the elements where such devices are typically used and also preferably heat the ground or floor within the cover member.

It is an object of the present invention to provide a heating element capable of heating the floor of the interior of the cover for a fluid flow device by placing the heating element at, near or adjacent to the ground or floor.

It is an object of the present invention to provide a heating element capable of heating the floor of the interior of the cover for a fluid flow device by placing the heating element at, near or adjacent to the floor to establish a thermal gradient less than 2 degrees per vertical inch of elevation.

These and other objects, advantages, and features of the present invention shall become apparent after consideration of the specifications and drawings, as well as the claims, set forth herein. All such additional objects, features, and advantages are believed to be contemplated by the scope of the present invention and are therefore believed to be included, although not referenced, herein.

DETAILED DESCRIPTION OF THE PREFERRED EMBODIMENT(S)

Figure 1:
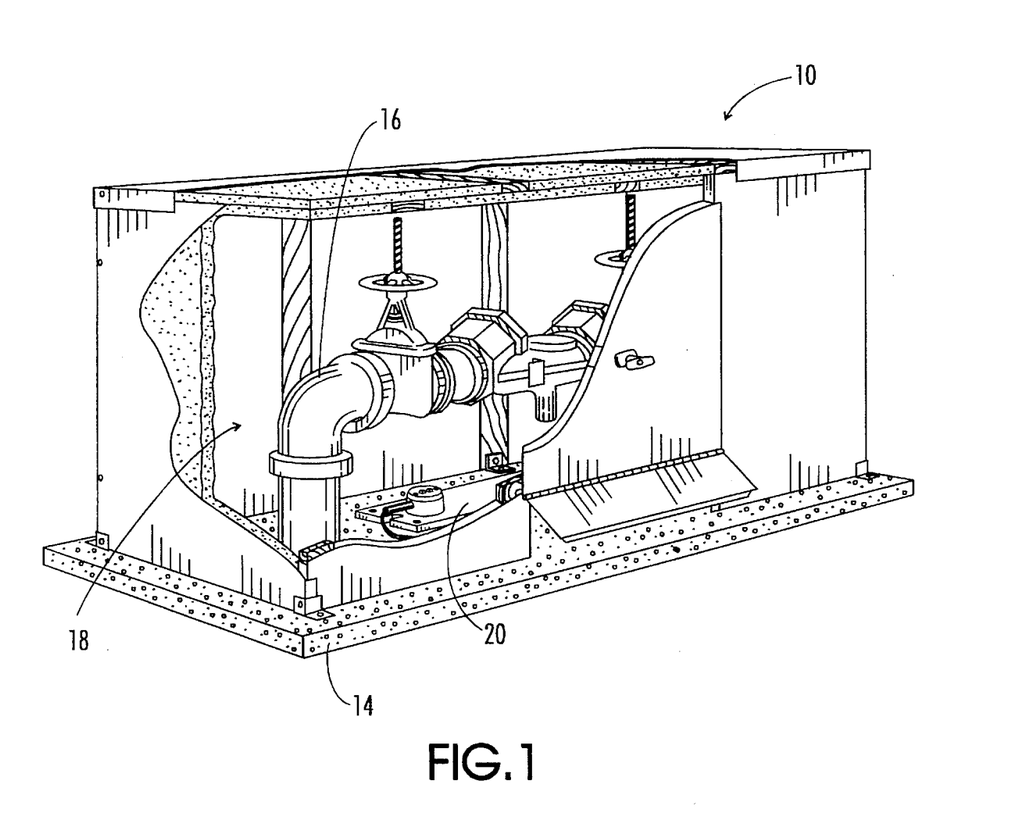
FIG. 1 is an elevated, partially fragmented perspective view of a cover for a fluid flow device.

With reference to FIG. 1, a cover component of the present invention is designated generally by the reference numeral 10. Cover 10 rests on the ground or a pad 14 (i.e., the ground surface for the cover) and effectively covers or shrouds a fluid flow device 16 contained within the interior 18. Heating element 20 is shown resting on the pad 14, but is generally understood that the heating element 20 may be placed at, near or adjacent to the ground or pad, even though not directly in contact therewith. In such configurations, the heater may incorporate a means for slightly elevating the heater above the ground or pad.

With reference to FIGS. 2 through 6, the heating element shown generally in FIG. 1 is illustrated in more detail. Heating element 20 has a top surface 32, a bottom surface 34, a first end 36, and a second end 38. The shape of the heating element 20 is preferably rectangular as shown, but may be of any other suitable orientation or configuration so long as the heating element ideally covers a large surface area of the floor within the cover component disclosed herein. Heating coils (not shown) are encased and held by the body of the heating element. Conduit 40 is provided to carry the electrical connections 42 from a thermostat (not shown). Electrical connections 42 attach to the conductive posts 44 associated with the embedded coils (not shown). A means 52 are optional and may extend from the body of the heating element (see FIG. 5).

A thermostat (not shown) is connected to the electrical connections 42 to provide a means of adjusting the temperature of the heating element. The thermostat may include any suitable commercially available thermostat, but is preferably a Dayton Thermostat, Model No. 4E636, having an operating temperature range of 40–100 degrees.

Figure 2:
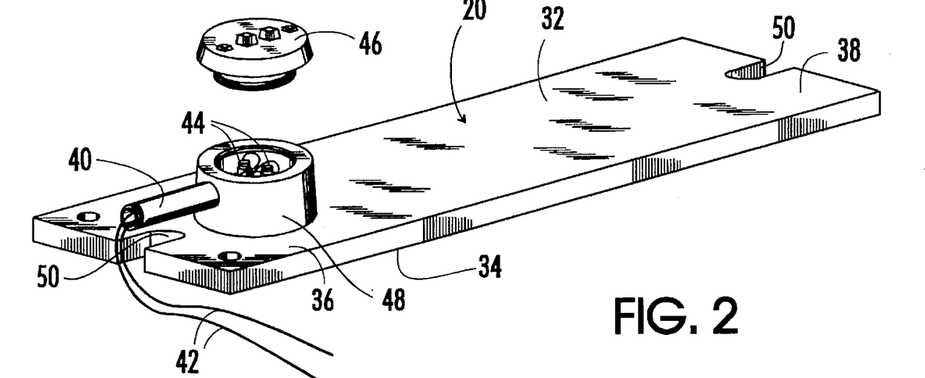
FIG. 2 is an elevated perspective view of the preferred embodiment of the heating element of the present invention.
Figure 3:
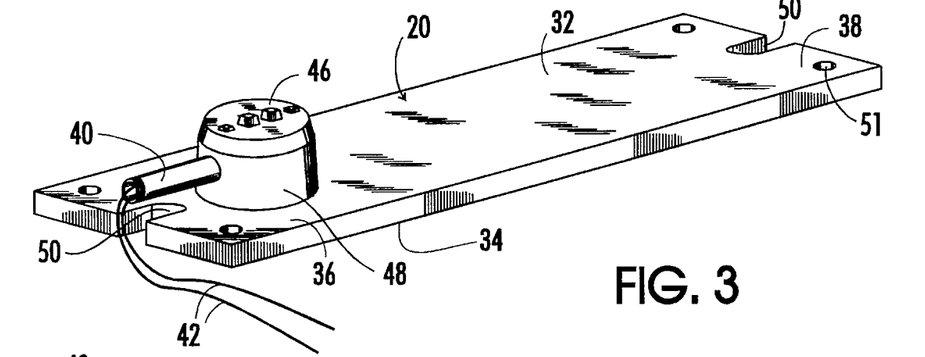
FIG. 3 is an elevated perspective view of the heating element of FIG. 2 and shown with the cap component in place.

With reference to FIGS. 2 and 3, a cap member 46 is placed over the conductive posts 44 which are positioned within an elevated well 48 to effectively seal the conductive posts 44 and electrical connections 42 from the environment. Mounting slots 50 are spaced apart and positioned at each end of the body of the heater 20. The slots 50 are provided as a means of mounting the heater 20 within a cover assembly by any suitable means or fastener(s), and are preferably cast into the construction of the heater.

Figure 4:
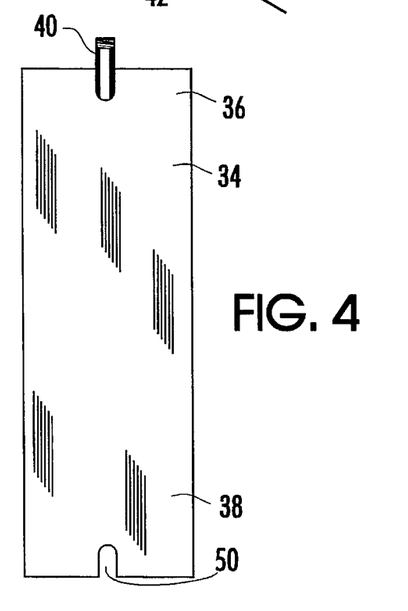
FIG. 4 is an elevated perspective view of the back or bottom side of the heating element of FIGS. 2 and 3.
Figure 5:
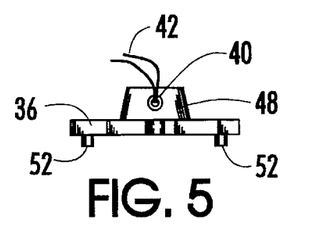
FIG. 5 is an end view of the heating element shown in FIGS. 2 through 4 with the optional feet attached.
Figure 6:
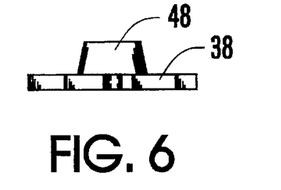
FIG. 6 is an end view opposite the end shown in FIG. 5, but without the optional feet.
Figure 7:
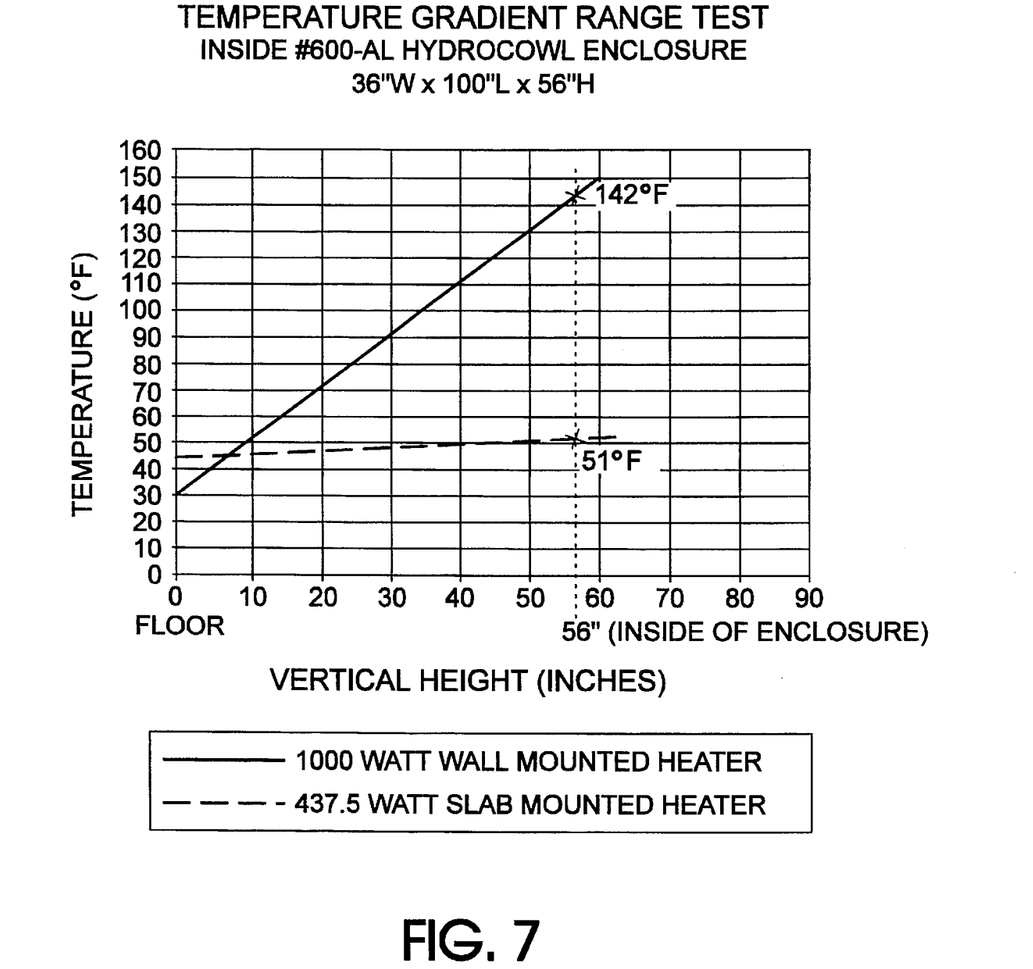
FIG. 7 is a graphic representation of the operating characteristics of the heater component of the present invention shown in comparison to the operating characteristics of a conventional wall mounted heater.

Optional apertures 51 may be provided in the alternate embodiments of the heater in order to receive a conventional fastener such as a screw, bolt, pin or the like if the heating element is to be anchored within the floor of the cover, or a plurality of feet or pegs 52 allow the heater to be placed in close proximity adjacent to the pad 14 or ground surface.

An embodiment of the feet or pegs may comprise a conventional fastener in the nature of a series of long shank bolts and nuts such that the shank of a conventional bolt extends below the bottom surface 34 and therefore provides a spacer upon which the heating element 20 may be raised above the ground or pad.

Figure 8:
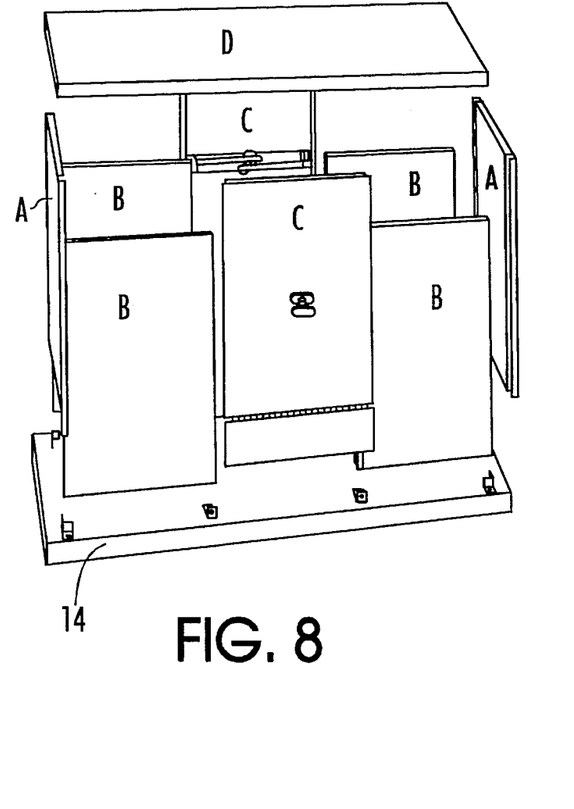
FIG. 8 is an elevated, partially exploded perspective view of an alternate embodiment of the cover shown in FIG. 1.
Figure 9A:
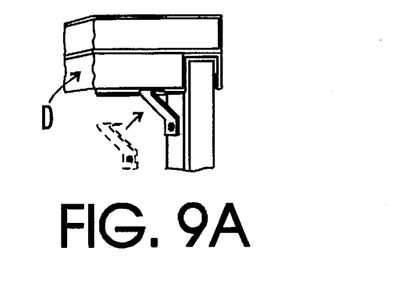
FIGS. 9A–9C are fragmentary perspective views of the attachment of the embodiment of the cover assembly shown in FIG. 8 in communication with the ground surface on which it rests.
Figure 9B:
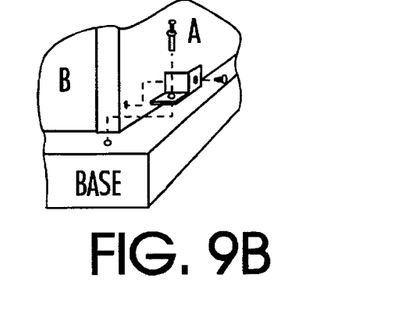
Figure 9C:
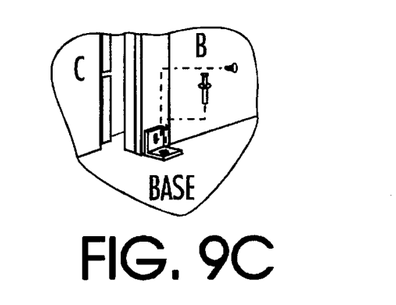

With reference to FIG. 8, an embodiment of the cover of FIG. 1 is shown with the cover panels in an exploded fashion. Cover panels A, B, and C as well as roof D are designed to interconnect and attach to the concrete pad or floor 14. The interconnection of the panels with one another, as well as the concrete pad or base is depicted in FIGS. 9A through 9C.

Figure 10:
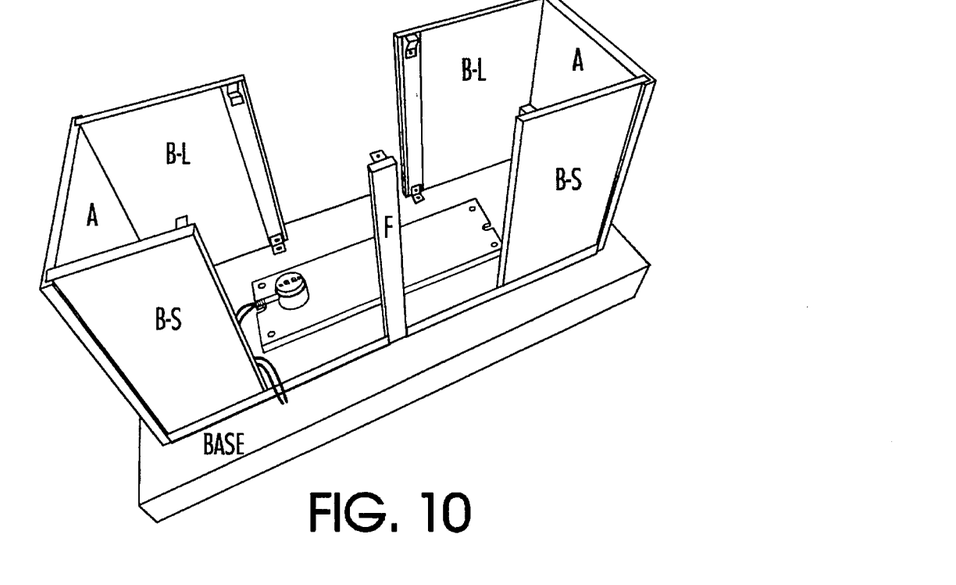
FIG. 10 is an elevated perspective view of an alternate embodiment of a cover for a fluid flow device with several panels removed and the heating element of the present invention adjacent to the floor of the cover.
Figure 11:
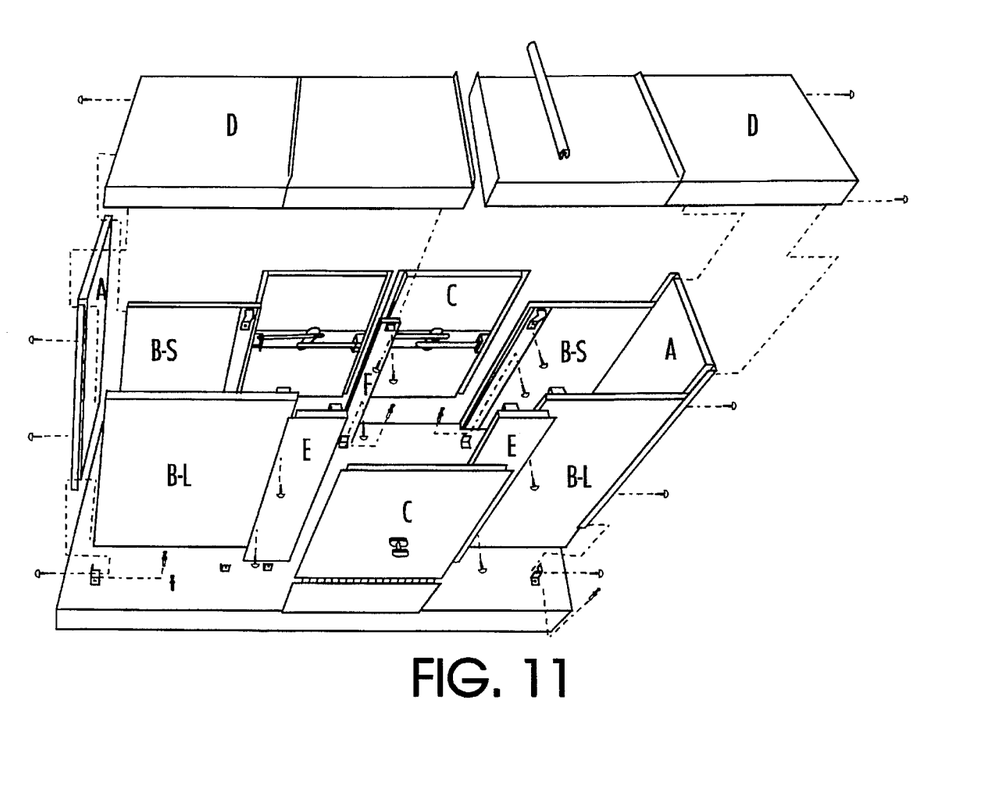
FIG. 11 is an exploded, elevated perspective view of an alternate embodiment of a cover assembly.
Figure 12:
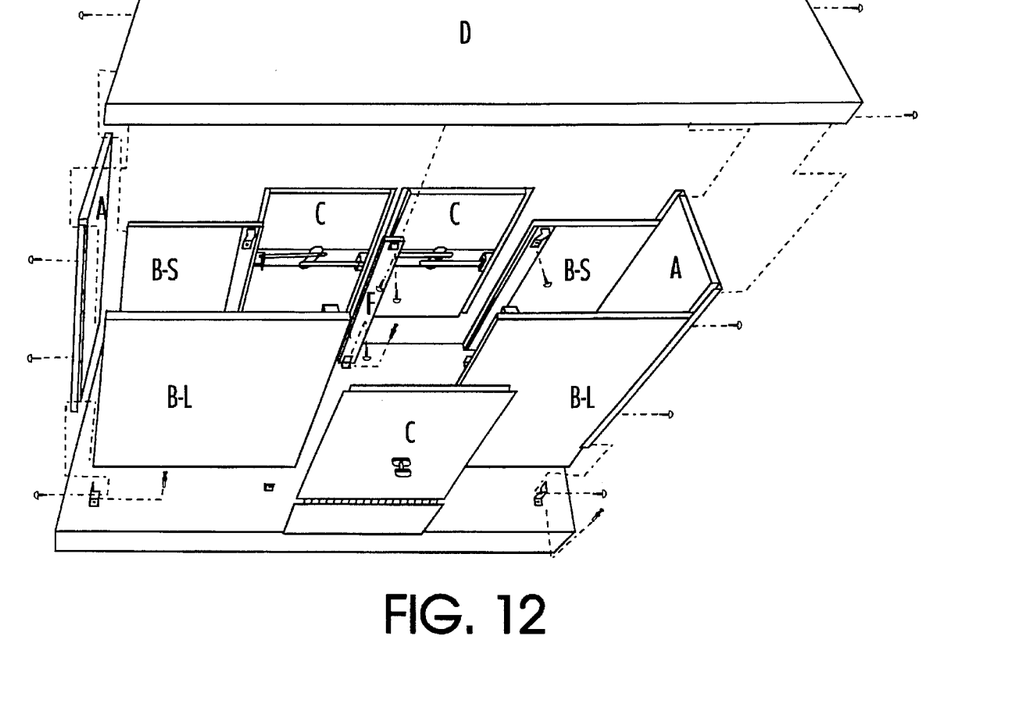
FIG. 12 is an alternate embodiment of the cover shown in FIG. 11.

With reference to FIGS. 10, 11 and 12, an alternate embodiment of the cover of FIG. 1 is illustrated. Once again, panels A–B series, C, roof D and panels E are shown in exploded fashion, but in relative alignment with one another for assembly. As illustrated in FIG. 10, a cover assembly incorporating members F is provided as the means of structural support for the various panels. The panels and roof are assembled in much the same fashion as those illustrated with respect to FIG. 8, but more particularly with respect to FIGS. 9-A through 9-C.

Figure 13:
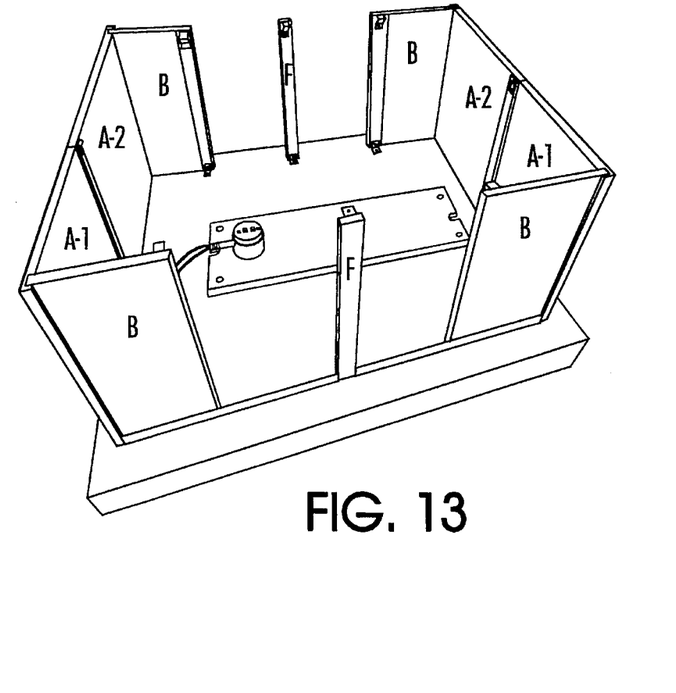
FIG. 13 is an alternate embodiment of the cover of FIG. 10.
Figure 14:
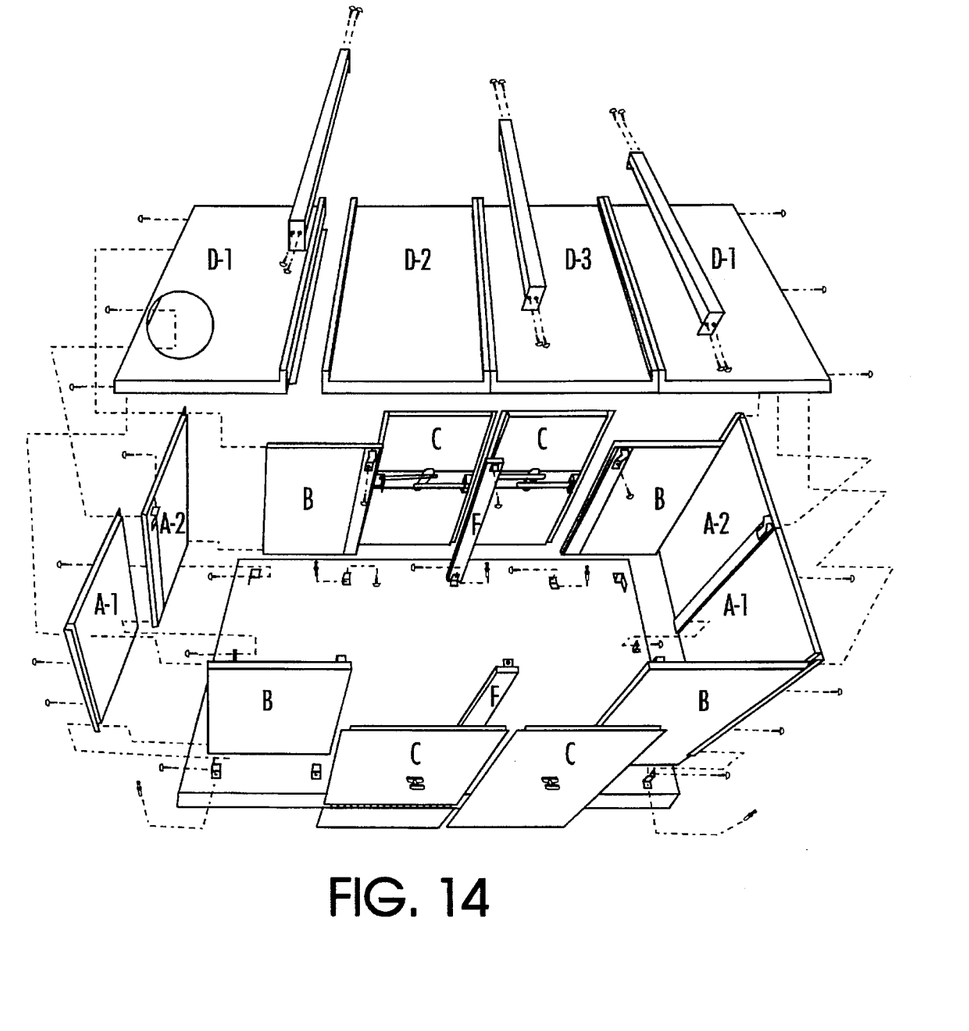
FIG. 14 is an alternate embodiment of the cover shown in FIGS. 11 and 12 as it relates to FIG. 13.

With reference to FIGS. 13 and 14, a large embodiment of the cover is illustrated. The cover assembly is shown as having a plurality of panels A, B, and C spaced around its periphery. Upright supports F are provided as a means of attachment of the panels and are fashioned similar to that described with respect to FIGS. 8, and 9A–9C. Roof D also is comprised of a plurality of roof caps G which effectively are provided to inter-engage as well as seal off the interstices between the various roof panels D-1 through D-3.

These and other embodiments of the present invention shall become apparent after consideration of the specifications, drawings, and claims set forth herein. All such additional embodiments and configurations are believed to be contemplated and included within the scope of the present invention even though they are not specifically set forth herein.

What is claimed is:

1. A heated cover assembly for a fluid flow device extending from a ground surface, comprising:

a cover having a side wall, a roof, and an interior for enclosing a fluid flow device;

a heater positioned within the interior of the cover and supported by and in contact with the ground surface in order to heat the ground surface in the regions where the fluid flow device emerges from the ground surface and extends upwardly into the interior of the cover;

the heater has a top side, a bottom side, an edge, and heating coil means disposed within a body of the heater for producing heat in response to a supplied electrical current, wherein the heat is transmitted to the body of the heater and emanates therefrom to establish a substantially uniform thermal gradient in the interior of the cover from the ground surface on which the heater is supported to the roof.

2. The heated cover assembly of claim 1, wherein:

the continuous side wall of the cover is comprised of a plurality of interconnected panels.

3. The heated cover assembly of claim 2, further including:

a plurality of panels having edges to which adjacent panels are connected.

4. The heated cover assembly of claim 1, wherein:

the ground surface is a pad means for attaching the cover thereto.

5. The heated cover assembly of claim 1, wherein:

the heater is constructed of metal.

6. The heated cover assembly of claim 1, where:

the heater has s substantially rectangular shape and an edge surface interpositioned between the top and bottom surfaces.

7. The heated cover assembly of claim 1 wherein the heater further includes:

a well, and at least one conductive post connected to the heating coil means and contained within the well.

8. The heated cover assembly of claim 1 further including:

thermostat means for regulating the temperature of the heater.

9. The heated cover assembly of claim 1, further including:

spacer means, positioned between the heater and the ground, for elevating the heater above the ground.

10. A heated cover assembly for a fluid flow device extending from the ground, comprising:

cover means for covering a fluid flow device, the cover means including a side wall, a roof and an interior;

heater means, positioned within the interior of the cover means positioned in close proximity to the fluid flow control device which is supported by and in contact with the ground surface in order to heat the ground surface in the regions where the fluid flow control device emerges therefrom and extends upwardly into the interior, and for supplying heat to the interior of the cover;

the heater means includes a body with a top side, a bottom side, and a heating coil disposed within the body, wherein the heating coil is responsive to electrical energy to enable heat to be transmitted to the body and emanate therefrom to enable a substantially uniform thermal gradient in the interior of the cover from the ground to the roof.

11. The heated cover assembly of claim 10, wherein:

the continuous side wall of the cover is comprised of a plurality of interconnected panels.

12. The heated cover assembly of claim 11, further including:

a plurality of panels having an edge enabling the plurality of panels to be connected.

13. The heated cover assembly of claim 10, wherein:

the ground surface is a pad means for attaching the cover thereto.

14. The heated cover assembly of claim 10, wherein:

the heater is constructed of metal.

15. The heated cover assembly of claim 10, where:

the heater has a substantially rectangular shape and an edge surface interpositioned between the top and bottom surfaces.

16. The cover assembly of claim 10 wherein the heater further includes:

a well, and at least one conductive post connected to the heating coil and contained within the well.

17. The heated cover assembly of claim 10 further including:

thermostat means for regulating the temperature of the heater.

18. The heated cover assembly of claim 10, further including:

foot means, positioned between the heater and the ground, for elevating the heater above the ground.

19. A method of heating a fluid flow device extending from the ground and contained within a cover assembly wherein the cover assembly is comprised of a plurality wall panels and a roof to form an interior, and further including a heater, the method comprising the steps of:

providing a heater capable of responding to electrical energy to produce heat;

positioning the heater on the ground surface in order to heat the ground surface in the regions where the fluid flow device emerges from the ground surface from which the fluid flow device extends upwardly into the interior;

supplying electrical energy to the heating element to produce heat within the interior of the cover assembly; and regulating the electrical energy to regulate the amount of heat supplied.

20. The method of claim 19, further including the step of:

providing a pad within the interior adjacent to the ground and positioning the heater on the pad.

21. A heated cover assembly wherein the cover includes a side wall, a roof and an interior for housing a fluid flow control device extending from a ground surface, the heated cover assembly further comprising:

a substantially rectangular heater having a heater body which is positioned on the ground surface in order to heat the ground surface in the regions where the fluid flow control device emerges from the ground surface and extends upwardly into the cover;

slot means for attaching the heater to the ground surface;

a heating coil contained within the body;

electrical connection means for supplying electrical energy to the heating coil and further including conductive post means for transferring the electrical energy to the coil;

thermostat means for regulating the amount of electrical energy supplied to the conductive post means; and wherein the heater enables a thermal gradient less than one degree Fahrenheit per vertical inch inside the cover assembly.

22. The heated cover assembly of claim 21, wherein:

the thermal gradient is 0.125 Fahrenheit per vertical inch.

23. The heated cover assembly of claim 21, wherein:

the heater is formed from a cast metallic material.

* * * * *